(12) United States Patent
Le Men et al.

(10) Patent No.: US 7,303,083 B2
(45) Date of Patent: Dec. 4, 2007

(54) EASY MOULDING FILTER ELEMENT SUPPORT TUBE

(75) Inventors: Gildas Le Men, Guengat (FR); Robert A. Bannister, Stoughton, WI (US); Michael J. Connor, Stoughton, WI (US); Michael R. Furseth, Sheboygan Falls, WI (US)

(73) Assignee: Fleetguard, Inc., Nashville, TN (US)

( * ) Notice: Subject to any disclaimer, the term of this patent is extended or adjusted under 35 U.S.C. 154(b) by 117 days.

(21) Appl. No.: 11/239,667

(22) Filed: Sep. 29, 2005

(65) Prior Publication Data

US 2006/0070945 A1  Apr. 6, 2006

(30) Foreign Application Priority Data

Oct. 5, 2004 (FR) ................................. 04 10510
Aug. 25, 2005 (FR) ................................. 05 08762

(51) Int. Cl.
*B01D 29/13* (2006.01)
*B29C 45/00* (2006.01)

(52) U.S. Cl. ..................... 210/483; 210/485; 210/487; 264/328.1

(58) Field of Classification Search .................. None
See application file for complete search history.

(56) References Cited

U.S. PATENT DOCUMENTS

| 493,791 | A | * | 3/1893 | Schurig ........................ 72/326 |
| 2,843,269 | A | | 7/1958 | Dudinec |
| 3,746,595 | A | * | 7/1973 | Leason ................ 264/DIG. 48 |
| 4,748,841 | A | * | 6/1988 | Mezger et al. ................ 72/326 |
| 5,980,744 | A | * | 11/1999 | Gagnon et al. ............. 210/457 |
| 6,103,119 | A | | 8/2000 | Clements et al. |
| 6,478,959 | B1 | | 11/2002 | Morgan et al. |

FOREIGN PATENT DOCUMENTS

| EP | 414336 A2 * | 2/1991 | ................ 210/485 |
| JP | 2004-167805 | 6/2004 | |

* cited by examiner

*Primary Examiner*—Krishnan Menon
*Assistant Examiner*—Madeline Gonzalez
(74) *Attorney, Agent, or Firm*—Andrus, Sceales, Starke & Sawall, LLP; J. Bruce Schelkope (57) ABSTRACT

A filter element support tube has a pair of axially extending spines and first and second sets of oppositely laterally extending half-rings axially offset from each other. The support tube is efficiently manufacturable, and desirably provides a constant diameter along its axial length.

2 Claims, 7 Drawing Sheets

EASY MOULDING FILTER ELEMENT SUPPORT TUBE

CROSS-REFERENCE TO RELATED APPLICATIONS

This application claims priority from French Patent Application No. FR 05 08762, filed Aug. 25, 2005, and from French Patent Application No. FR 04 10510, filed Oct. 5, 2004, incorporated herein by reference.

BACKGROUND AND SUMMARY

The invention relates to filter element support tubes.

Filter element support tubes are known in the prior art. The support tube may be a center tube or inner liner extending axially in the hollow interior of an annular filter element circumscribing the tube and supported thereby. Alternatively or additionally, the support tube may be an exterior outer tube or liner extending axially along and circumscribing the exterior of an annular filter element supported thereby.

The present invention arose during continuing development efforts directed toward simplified, lower cost filter element support tubes, including manufacturing efficiency.

BRIEF DESCRIPTION OF THE DRAWINGS

FIGS. 1-9 are taken from the noted French priority applications.

DETAILED DESCRIPTION

Priority Applications

The following description is taken from the noted French priority applications.

The invention of the noted French priority applications relates to the area of the design and implementation of filtering units used to filter fluids circulating in engines or hydraulic equipment, including a hollow element intended to engage with a filter cartridge in a filtering unit, and related filtering unit and mould.

Such filtering units are constituted by a filter body inside which is placed a filtering cartridge, which is generally of cylindrical shape and which includes a filter medium, which may for example be paper, cardboard or even felt. This filter medium is conventionally delimited by two end flanges.

There are two possible scenarios indicated in the noted French priority applications.

Either the filter cartridges engage with a central tube, which may or may not be integral with the flanges, the outer diameter of which is close to the inner diameter of the filter medium so as to limit the distortions of the medium under the effect of the pressure being exerted inside the filtering unit.

Or the cartridges are inserted into a tube the inner diameter of which is close to the outer diameter of the filter medium, so as to limit the distortions of the medium due to the passage of the fluid from the central space of the medium towards the outside of the medium.

Filtering units are known that employ a support tube to which the filter cartridge is added, the central tube being permanently assembled in the filtering unit.

Alternatively, the lower flanges of the cartridges extend in order to present means for installing and holding the cartridge in the filtering unit, the central tube being in this case assembled and disassembled jointly with the cartridge.

The invention of the noted French priority applications applies equally to the different configurations which have just been cited.

Figure 1:
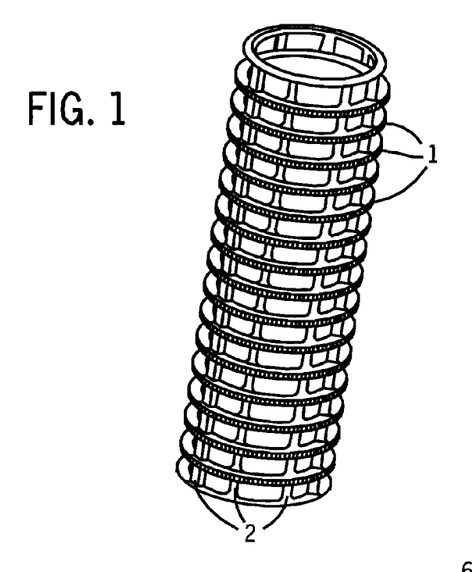
FIG. 1 is a perspective view of a filter element support tube.

In the technique according to which the holding tube is integrated with the cartridge, the tube conventionally has a structure like the one shown in FIG. 1.

The structure of such a tube consists mainly, as can be seen, of a series of rings 1 evenly distributed along uprights 2, the rings forming support means for the filter medium.

Conventionally, these tubes are made out of a plastic material by moulding.

The tube design involves the use of a mould and a core. It will be remembered that a part of this kind is removed from the mould by a process involving two movements in perpendicular directions: one to open the mould and the other to withdraw the core.

Clearly, lead times are set with the time taken to fully complete these two movements being taken into consideration.

Furthermore, it is known that the cost price of a moulded part depends to a large extent on the lead time.

One drawback of the current technique is due therefore to the holding tube design, which involves the use of a manufacturing process in which the lead times may be difficult to reduce.

One particular objective of the invention of the noted French priority applications is to overcome this drawback of the prior art.

To be more precise, the objective of the invention of the noted French priority applications is to propose a filter cartridge tube that is able to be manufactured at a cost price that is notably less than that of traditional prior art tubes.

Another objective of the invention of the noted French priority applications is to provide a tube that can be obtained by using more straightforward machinery than that of the prior art.

These objectives, together with others which will emerge subsequently, are met by means of the invention of the noted French priority applications the subject of which is a hollow element intended to engage with a filter cartridge in a filtering unit for a fluid circulating in an engine or a piece of hydraulic equipment, of the type that has support means for a filter medium included in said cartridge, said support means extending from connection means, and having between them channels that allow said fluid to flow, characterized in that said support means and said connection means have in space surfaces that are able to be defined by two complementary volumes making room between them for a cavity corresponding to said support means and said connection means, said complementary volumes being provided so as to interlock one in the other to define said cavity.

In this way, by means of the invention of the noted French priority applications, the holding tube may be manufactured without recourse to a core, the two complementary volumes being sufficient to fully define the tube.

The machinery required to mould the tube is therefore considerably simplified.

One direct consequence of designing the tube in accordance with the invention of the noted French priority applications is that demoulding can be performed in a single movement of opening the mould (the movement to withdraw the core disappearing).

The result of this is that notable gains can be achieved in respect of the lead times and, consequently, of the cost price of the tube.

Furthermore, in the absence of a core, the moulding stations are able to take up less space relative to that of prior art stations, a gain that is achieved from the space required for the movement to withdraw the core.

Moreover, simplifying the machinery also translates into reducing the costs of machinery.

According to one preferred solution, said support means extend in two distinct peripheral portions each extending over an angle of about 180° without said portions overlapping one another.

A straightforward and effective solution is thereby obtained to allow moulding with a single mould movement (without core), and is so with the medium being held over 360°.

To advantage, said connection means include two diametrically opposite longitudinal uprights.

According to one advantageous solution, said support means are distributed along said connection means with a regular alternation between said peripheral portions.

The filter cartridge medium is thereby held, in a consistent way, over its full height. It is however conceivable to arrange the support means unevenly while preserving satisfactory holding quality.

According to one preferred embodiment, said support means take the form of half-rings, arranged in such a way that one half-ring in one of said peripheral portions is placed, along the longitudinal axis of said element, between two half-rings in the other of said peripheral portions, and vice versa.

Compared with a tube with circular rings which would be made with the same quantity of material, the fact of providing only semi-circular rings (extending therefore over 180°) generates a loss of holding of the medium of the order of only 20%.

Such a difference may easily be compensated for if required by an appropriate increase in the quantity of material.

Whatever the circumstances, this difference would seem to be of secondary importance when set against the considerable gains which may be envisaged on account of the invention of the noted French priority applications.

It should furthermore be noted that the half-rings are able to take different shapes in other conceivable embodiments, for example oval, or even rectangular etc.

According to one advantageous solution, said half-rings of one of said peripheral portions are spaced out with a gap between them of between once and about twenty times the thickness of said half-rings of the other of said portions and vice versa.

In this way, the tube design may give more or less substantial economies of material, while remaining within satisfactory limits in respect of the quality of holding obtained.

According to another conceivable embodiment, said half-rings of one of said peripheral portions are spaced out with a gap between them equal to about once the thickness of said half-rings of the other of said portions and vice versa.

According to another characteristic, the thickness of said half-rings and the gap between them are consistent over the height of said element.

Other configurations are obviously conceivable without departing from the framework of the invention of the noted French priority applications, particularly if the pressure that is exerted on the medium inside the filtering unit is not consistent.

It is therefore conceivable for the thickness of the rings to vary and for their distribution along the element not to be regular.

To advantage, the accumulated heights of said support means form a height below the height of said element.

Clearly, the space between the support means may vary as much as required as a function of the crush resistance of the medium it is wished to obtain through the support means.

Preferentially, said half-rings of one of said portions form with the half-rings of the other of said portions rings that have a substantially constant diameter over the length of said element.

The invention of the noted French priority applications also relates to a filter unit for a fluid circulating in an engine or a piece of hydraulic equipment, of the type that incorporates a filter cartridge engaging with a hollow element of the type that has support means for a filter medium included in said cartridge, said support means extending from connection means, and having between them channels that allow said fluid to flow, characterized in that said support means and said connection means have in space surfaces able to be defined by two complementary volumes making room between them for a cavity corresponding to said support means and to said connection means, said complementary volumes being provided so as to interlock one in the other to define said cavity.

The invention of the noted French priority applications also relates to a mould for making a hollow element intended to engage with a filter cartridge in a filtering unit for a fluid circulating in an engine or a piece of hydraulic equipment, that has support means for a filter medium included in said cartridge, said support means extending from connection means, and having between them channels that allow said fluid to flow, characterized in that it includes two complementary elements forming two volumes intended to define the surfaces of said support means and said connection means, said volumes being intended, when they are interlocked one in the other, to make room between them for a cavity corresponding to said support means and said connection means.

Figure 2:
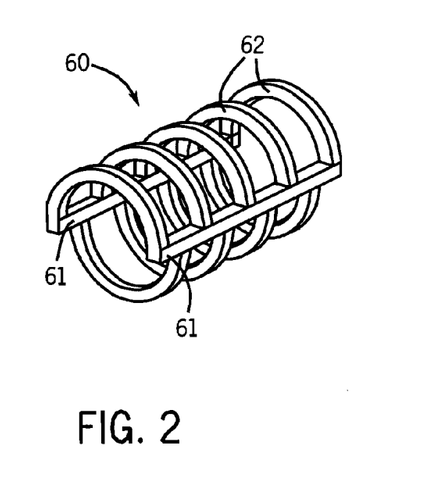
FIG. 2 is a perspective view of a support tube in accordance with the invention.
Figure 3:
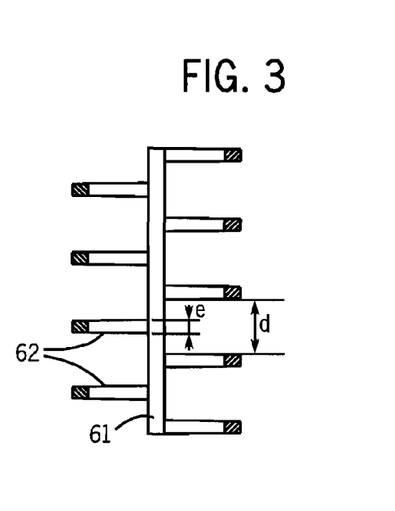
FIG. 3 is a side sectional view of the support tube of FIG. 2.
Figure 4:
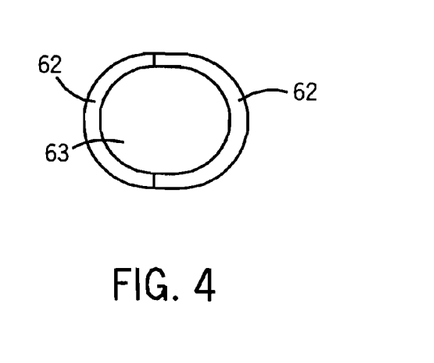
FIG. 4 is an end view of the support tube of FIG. 2.
Figures 5, 6:
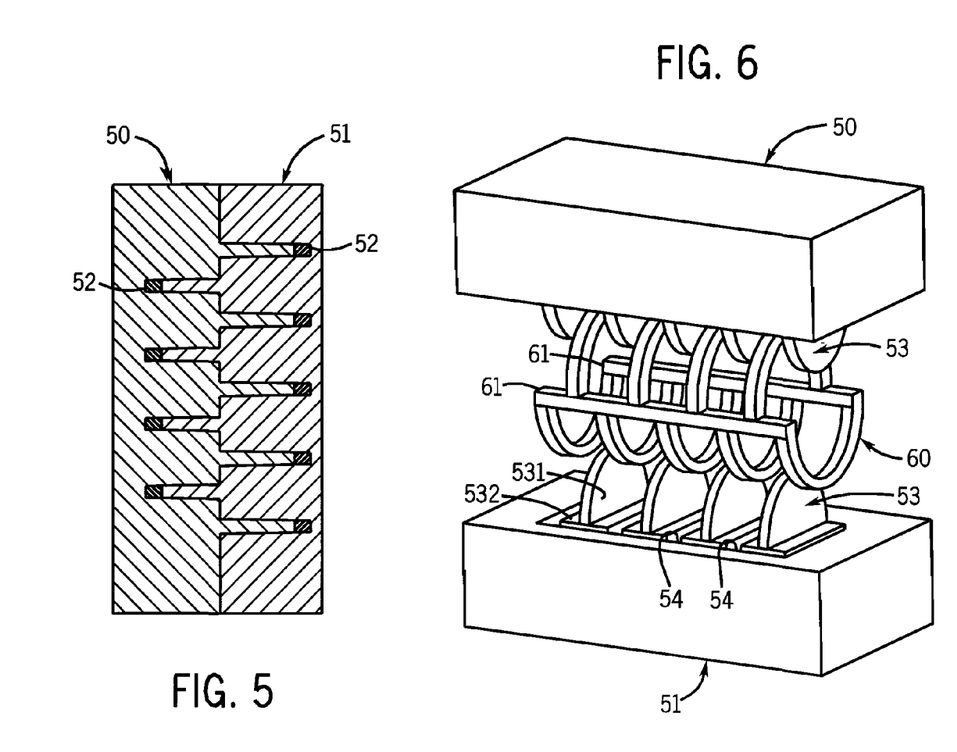
FIG. 5 is a side sectional view schematically illustrating a manufacturing method and moulding step.
FIG. 6 is an exploded perspective view of the assembly of FIG. 5.
Figure 7:
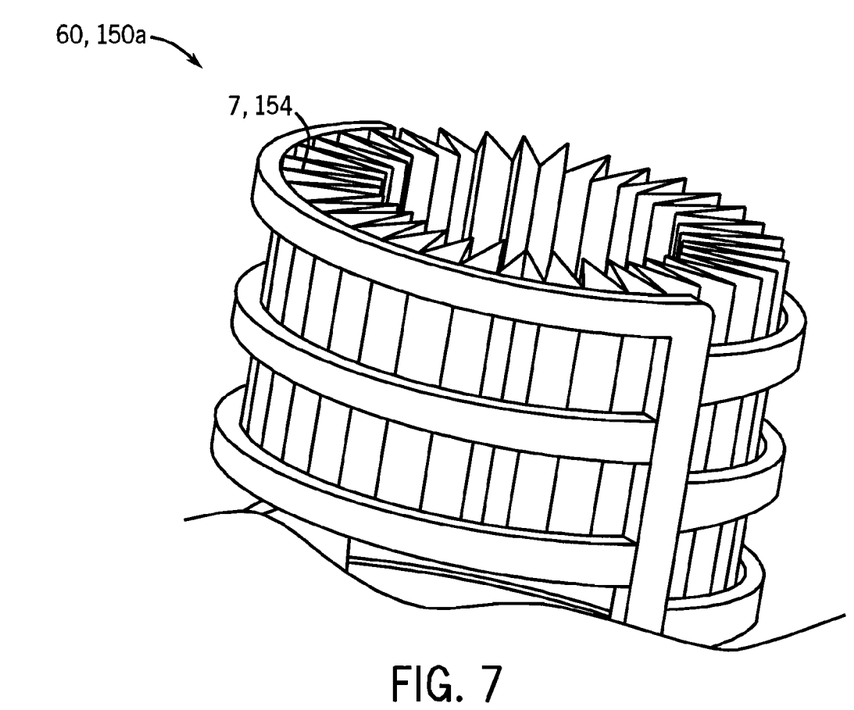
FIG. 7 is a perspective view showing an alternate embodiment.
Figure 8:
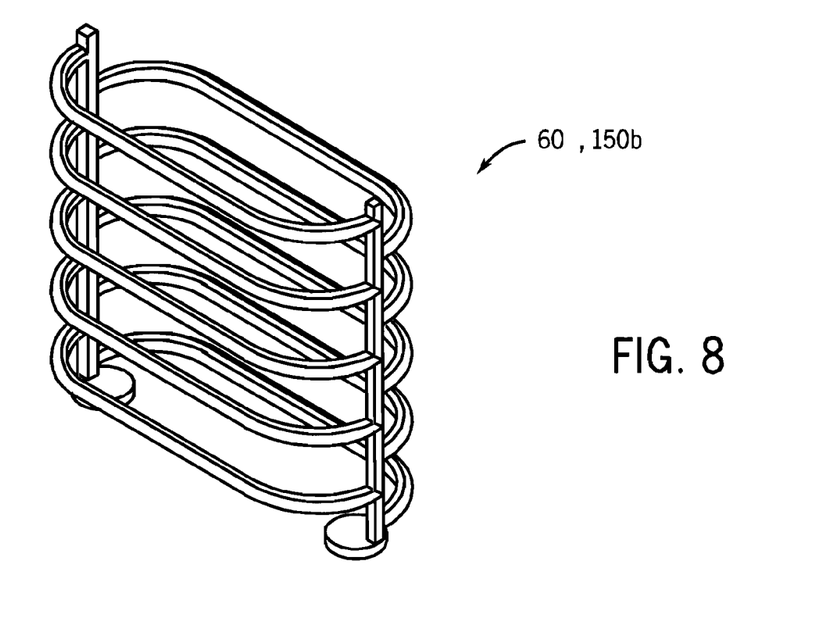
FIG. 8 is a perspective view showing another alternate embodiment.
Figure 9:
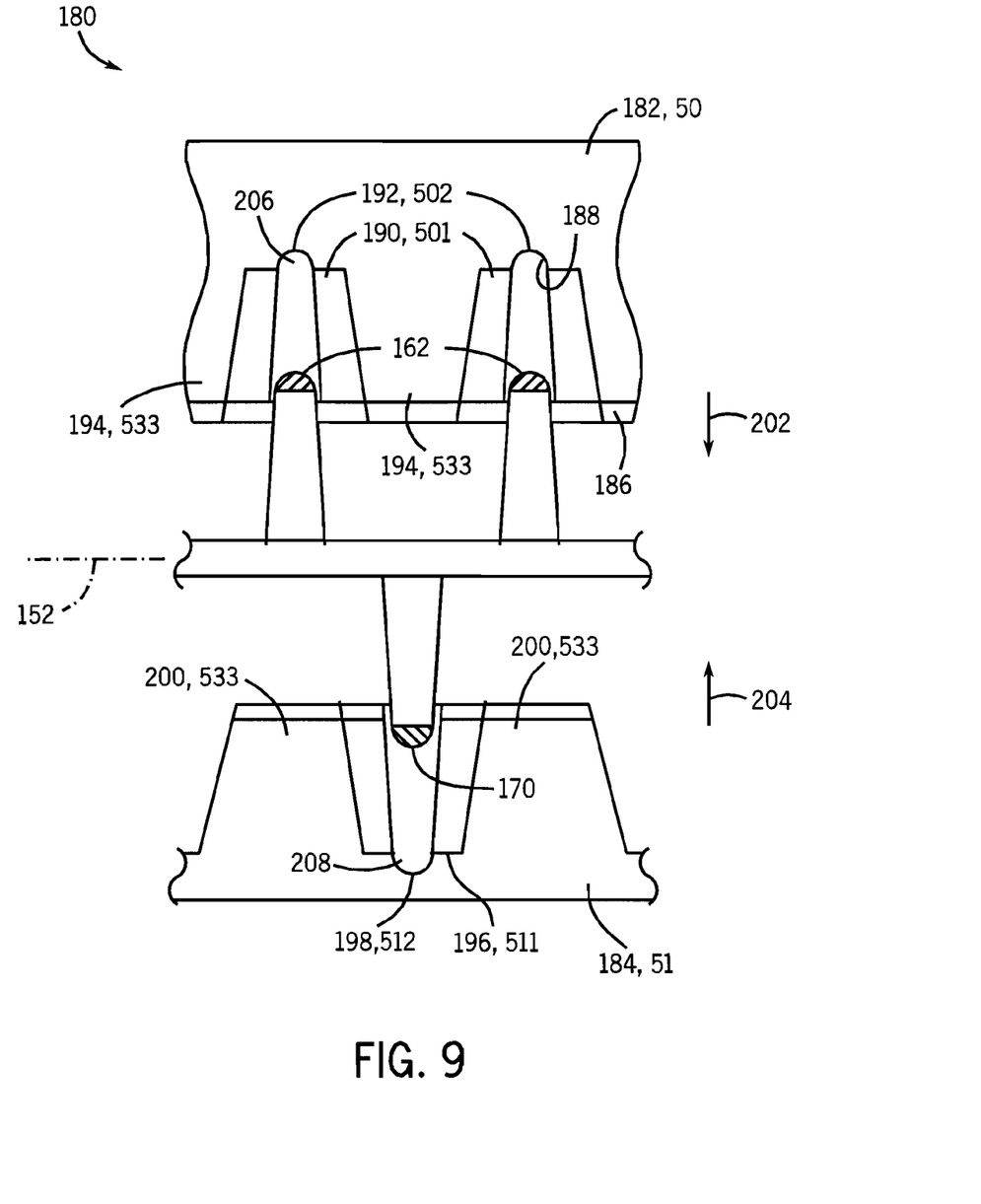
FIG. 9 schematically illustrates the manufacturing method for the filter element support tube of FIGS. 2, 12.

Other characteristics and advantages of the invention of the noted French priority applications will emerge more clearly from reading the following description of one preferential embodiment of the invention of the noted French priority application, given by way of example and non-restrictively and the appended drawings wherein:

FIG. 1 is a view of a central filter cartridge tube according to the prior art;

FIG. 2 is a perspective view of a central filter cartridge tube according to the invention of the noted French priority applications;

FIGS. 3 and 4 are views, along a longitudinal cross-section and from above respectively, of a central filter cartridge tube according to the invention of the noted French priority applications;

FIGS. 5 and 6 are views, along a longitudinal cross-section and in perspective respectively, of a mould for making a central filter cartridge tube according to the invention of the noted French priority applications;

FIG. 7 is a view of one particular embodiment of a tube according to the invention of the noted French priority applications;

FIG. 8 is a perspective view of one particular embodiment of a tube according to the invention of the noted French priority applications;

FIG. 9 is another partial view of a device for the manufacture of a tube according to the invention of the noted French priority applications.

As already mentioned previously, the principle of the invention of the noted French priority applications lies in the fact that it provides a tube for holding a filter medium the outlines and surfaces of which are defined by two complementary volumes making room between them for a cavity corresponding to the tube when the two volumes are interlocked one in the other.

This is shown in FIGS. 5 and 6, which show two volumes 50 and 51, in the event two elements of a tube-making mould able to interlock one in the other like combs and making room between them, when they are brought together, for a cavity 52 corresponding to the holding tube 60 according to the invention of the noted French priority applications.

According to the present embodiment, the holding tube, as shown in FIGS. 2 to 4, is constituted by two diametrically opposite uprights 61 connecting two series of half-rings 62, each series falling within a peripheral portion extending over 180° of the tube, the two portions not overlapping one another angularly.

As will emerge more clearly below, the tube according to the invention of the noted French priority applications is made in the form of a part cast in one piece, preferentially obtained by moulding an incinerable plastic material.

As shown in FIG. 4, seen from above, the half-rings 62 define a central channel 63 in which the filtered liquid is able to flow, the latter penetrating into this channel by passing through the spaces (or channels) between half-rings.

FIG. 8 shows an embodiment variant according to which the medium 7 is placed inside the central channel of the tube 60. Clearly, in this case, the filtered fluid passes from the central aperture of the medium towards the outside of the tube, passing through the spaces between the half-rings of the tube.

It should be noted that the thickness of the half-rings 62 and the gap between them is consistent along the whole length of the central tube.

It should also be noted that the alternation of half-rings between the two peripheral portions is regular. To be more precise, a half-ring of one portion is placed between two half-rings of the other portion and vice versa.

Furthermore, the gap between two half-rings of a peripheral portion is greater than the thickness of a half-ring of the other peripheral portion, falling within this gap, in such a way that the accumulation of the heights of the half-rings is below the height of the central tube.

According to the present embodiment shown in FIG. 3, the gap between two rings is about equal to four times the thickness.

It is specified that the term "half-rings" does not limit the shape of the holding tube to a cylindrical shape. Thus, the other "half-rings" may have different shapes, for example ovoid or elliptical, or even oblong like the ones shown in FIG. 8.

As already indicated previously, a central tube like the one which has just been described may be obtained by using a mould like the one shown in FIGS. 5 and 6.

Such a mould therefore includes two elements 50 and 51 of complementary shapes.

As can be seen, each element has male 53 and female 54 shapes, the male shapes of an element being intended to penetrate the female shapes of the other element in such a way that the two elements interlock.

Clearly, the male and female shapes are dimensioned in such a way that the cavity corresponding to the tube is obtained once the two elements are interlocked.

Each male element includes:
- a part 531 corresponding to the volume delimited by the internal surface of a half-ring, to which is added the volume corresponding to the thickness of the uprights 61;
- a part 532 corresponding to the volume between half-rings.

The female forms correspond to the external and lateral surfaces of the half-rings.

It will be understood that, on account of the tube design of the invention of the noted French priority applications, two of the female shapes 54 of an element and one male shape of the other element make it possible to define all the surfaces of the half-rings of a peripheral portion together with that of the half-ring of the other peripheral portion placed between said two half-rings.

Unlike the prior art, the tube according to the invention of the noted French priority applications is obtained with only two mould elements (without a core), which are moved, when closing or opening the mould, in a single direction.

With reference to FIG. 9 and as already indicated previously, a central tube according to the invention of the noted French priority applications is made by using two mould cavities provided by cavity moulds 50, 51, without recourse to a central core.

The cavity moulds 50, 51 are brought together during moulding to form a continuous circulation conduit of moulding material.

The cavity mould 50 has a set of recesses 501, 502, the recess 502 being deeper than the recess 501.

The sets of recesses 501, 502 are spaced out from each other by shapes 533 as mentioned above.

The cavity 51 has similar recesses 511, 512 spaced out by male shapes 533, and this in a way axially offset relative to the cavity 50.

The subject of the invention of the noted French priority applications is a hollow element intended to engage with a filter cartridge in a filtering unit for a fluid circulating in a engine or piece of hydraulic equipment, of the type that has support means (62) for a filter medium included in said cartridge, said support means (62) extending from connection means (61), and having between them channels that allow said fluid to flow, characterized in that said support means (62) and said connection means (61) have in space surfaces able to be defined by two complementary volumes (50), (51) making room between them for a cavity (52) corresponding to said support means (62) and to said connection means (61), said complementary volumes (50), (51) being provided so as to interlock one in the other in order to define said cavity (52).

A first aspect provides hollow element aimed at cooperating with the filtration cartridge of a filtering assembly for liquid circulating in an engine or hydraulic equipment, with support means (62) for a filtration media comprised by the said cartridge. These support means extend from link means (61) and have hollows to enable the liquid to flow. The support (62) and link means (61) present surfaces in space that can be defined by two complementary volumes (50), (51), that have between themselves hollows (52) corresponding to the support means and link means. The complementary volumes are aimed at fitting into each other to create the said hollow (52).

A second aspect provides an element according to the noted first aspect wherein said support means (62) extend in two distinct peripheral portions that move to an angle of 180° with no overlapping of the said portions between them.

A third aspect provides an element according to one of the noted first and second aspects wherein link means (61) have two longitudinal "posts" diametrically opposed.

A fourth aspect provides an element according to one of the noted second and fourth aspects wherein support means are situated along the link means (62) with regular alternation between the said peripheral portions.

A fifth aspect provides an element according to the noted fourth aspect wherein support means are half-ring shaped so as one half ring on one of the peripheral portions is situated according to the longitudinal axis of the said element between two half rings of the other peripheral portion and vice versa.

A sixth aspect provides an element according to any of the noted first through fifth aspects wherein cumulated heights of support means are shorter than the height of the said element.

A seventh aspect provides an element according to the noted fifth and sixth aspects wherein said half-rings of one of the peripheral portions have a space between them of one to approximately four times the thickness of the said half rings of the other portion and vice versa.

An eighth aspect provides an element according to any of the noted first through fifth aspects wherein said half-rings of one of the said peripheral portions have a spacing out equal to one time the thickness of the said half ring of the other said portion.

A ninth aspect provides the thickness of the said half rings and the spacing out between them are homogeneous on the height of the said element.

A tenth aspect provides a filtration assembly for liquid circulating inside an engine or hydraulic equipment integrating a filtration cartridge that cooperates with a hollow element with support means (62) for a filtration medium comprised by the said cartridge. The said support means (62) extend from the link means (61) and have hollows between them to enable the liquid to flow. The support (62) and link means (61) present surfaces in space that can be defined by two complementary volumes (50), (51), that have between themselves hollows (52) corresponding to the support means and link means. The complementary volumes are aimed at fitting into each other to create the said hollow (52).

An eleventh aspect provides a mould to produce a hollow element aimed at cooperating with a filtration cartridge of a filtering assembly for liquid circulating in an engine or hydraulic equipment with support means (62) for a filtration media comprised by the said cartridge. The said support means (62) extend from the link means (61) and have hollows to enable liquid to flow. It has two complementary elements forming two volumes aimed at defining the surfaces of the said support means (62) and said link means (61). The said volumes being aimed at (when fitted into each other) creating between them a hollow (52) corresponding to the said support means (62) and link means (61).

Present Invention

The above description regarding the noted French priority applications is hereby incorporated and included in the description of the present invention.

Figure 10:
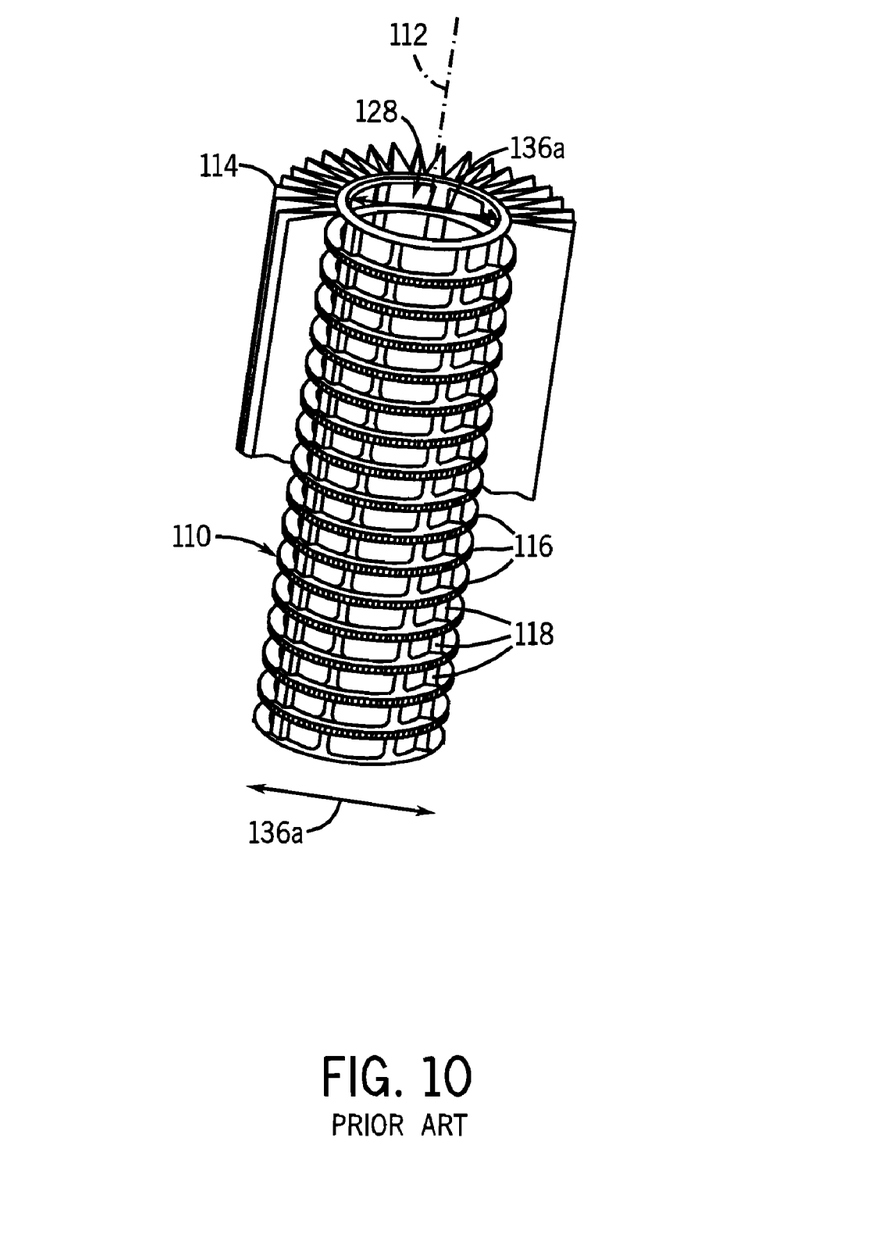
FIG. 10 is a perspective view of a filter element support tube known in the prior art.
Figure 11:
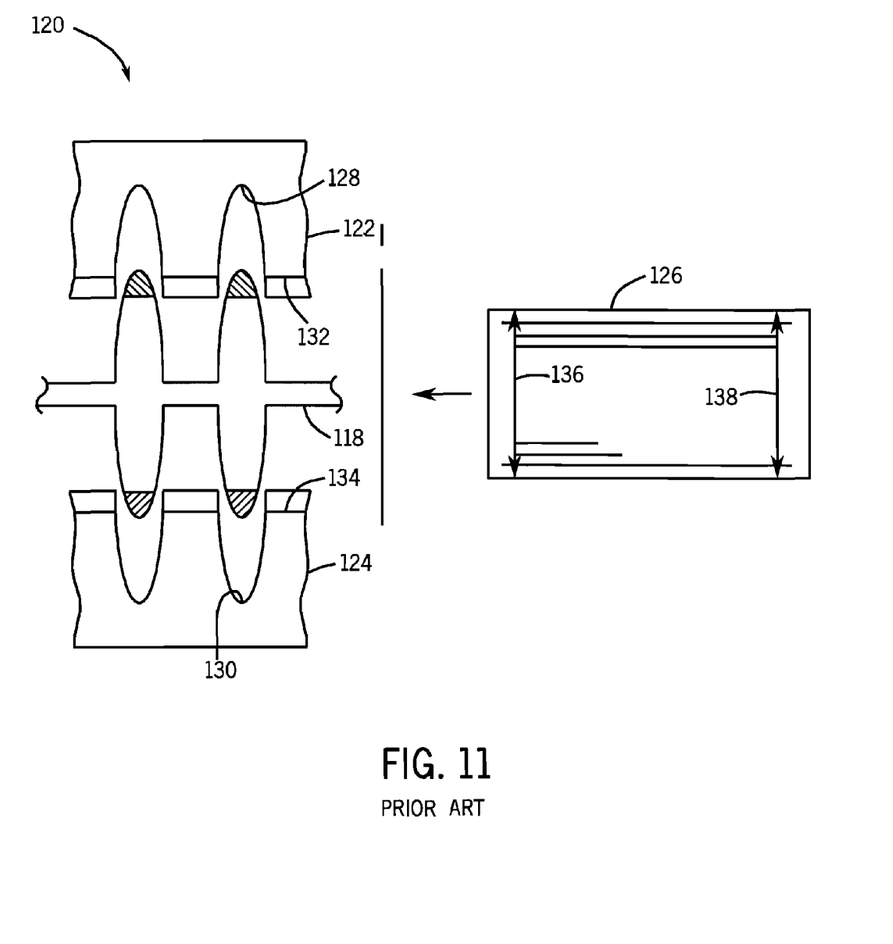
FIG. 11 schematically illustrates the manufacturing method for the support tube of FIG. 9.

FIG. 10 shows a support tube 110 known in the prior art and extending axially along an axis 112 and supporting a filter element 114 therearound, such as an annular pleated filter element. The support tube includes a plurality of rings 116 axially spaced from each other by a plurality of spines 118 extending axially therebetween. Support tube 110 is an incinerable plastic molded member formed in a mold 120, FIG. 11, having a pair of mold halves 122 and 124 laterally movable toward each other to close the mold and then receiving a core 126 axially slidable thereinto to form hollow interior 128 of the support tube. The mold halves 122, 124 have annular grooves such as 128, 130 for receiving the molten plastic and forming rings 116, and have axially extending grooves 132, 134 for forming spines 118. Core 126 has a draft angle to enable axial withdrawal thereof, i.e. core diameter 136 is less than core diameter 138. Accordingly, hollow interior 128, FIG. 10, of support tube 110 has a smaller diameter 136a at one axial end thereof than the diameter 138a at the other axial end thereof, which may be objectionable in some applications. The manufacturing inefficiency and the cost of the compound mold may also be objectionable.

Figure 12:
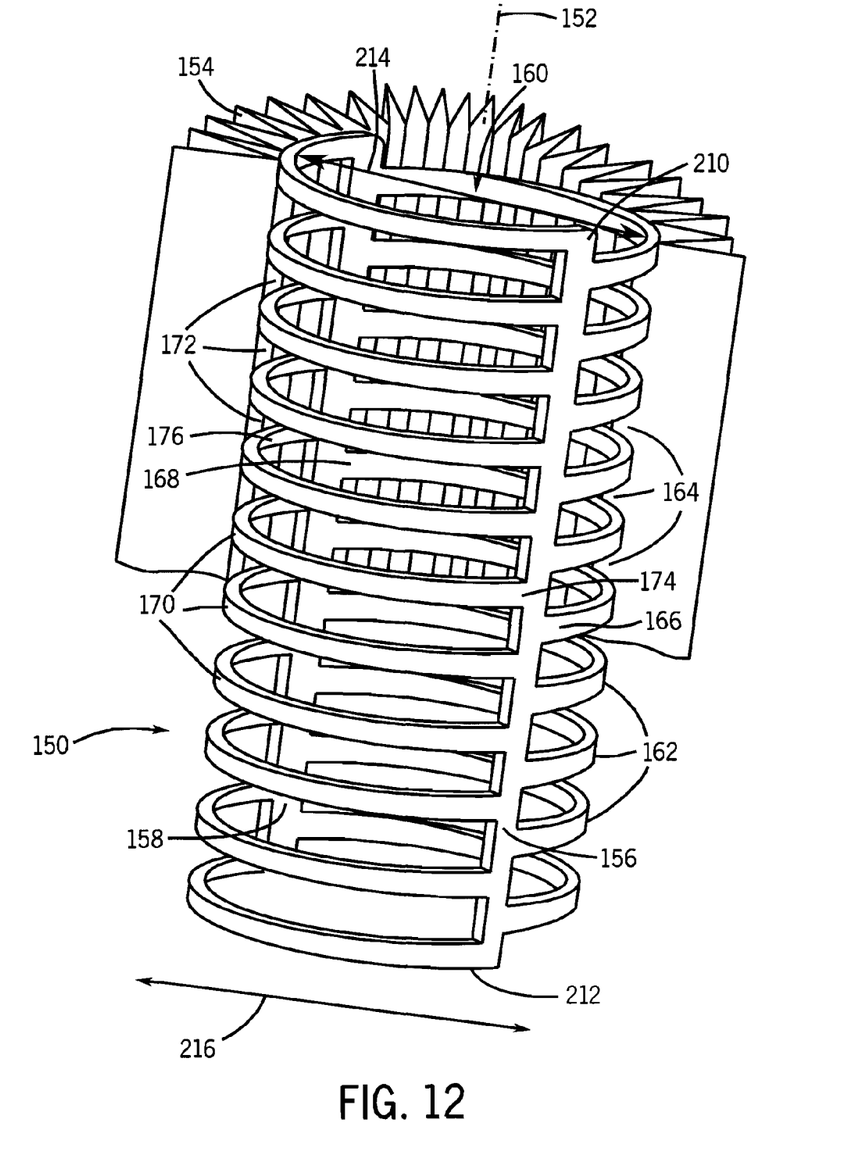
FIG. 12 shows a filter element support tube in accordance with the present invention.

FIG. 12 shows a filter element support tube 150 extending axially along an axis 152 and supporting a filter element such 154. Support tube 150 has a pair of axially extending spines 156 and 158 spaced from each other, preferably diametrically, across hollow interior 160. The support tube has a first set of half-rings 162 axially spaced from each other by a first set of axial gaps 164 therebetween. Each half-ring of the first set extends in an arc between a first end 166 terminating at spine 156, and a second end 168 terminating at spine 158. The arcs of the half-rings of the first set 162 extend in a first lateral direction, e.g. rightwardly in FIG. 12, from spines 156, 158. Support tube 150 has a second set of half-rings 170 axially spaced from each other by a second set of axial gaps 172 therebetween. Each half-ring of the second set 170 extends in an arc between a first end 174 terminating at spine 156, and a second end 176 terminating at spine 158. The arcs of the half-rings of second set 170 extend in a second lateral direction, e.g. leftwardly in FIG. 12, from spines 156, 158, opposite to the noted first lateral direction. The first and second sets of half-rings 162 and 170 are axially staggered relative to each other such that the half-rings of the first set 162 are laterally aligned with the second set of axial gaps 172, and the half-rings of the second set 170 are laterally aligned with the first set of axial gaps 164.

Support tube 150, including spines 156, 158 and half-rings 162, 170, is a single-piece molded plastic incinerable member. The support tube, including the noted axially extending spines with arcuate rings extending laterally therefrom, is molded in a two-piece mold 180, FIG. 9, without a center core such as 126 of FIG. 11. Mold 180 is a coreless mold having first and second mold halves 182 and 184 which are brought together in mating relation to form mold cavities 186 and 188 for the spines and rings without a center core which must otherwise be axially withdrawn. The mold halves are brought together to form a continuous flow channel providing the mold cavities in flow communication with each other. Mold half 182 has first and second sets of recesses 190 and 192. The second set of recesses 192 are deeper than and recessed from the first set of recesses 190. The first set of recesses 190 are axially spaced from each other by a first set of fingers 194 extending laterally therebetween. The second set of recesses 192 are in the first set of recesses 190. Second mold half 184 has third and fourth sets of recesses 196 and 198. The fourth set of recesses 198 are deeper than and recessed from the third set of recesses 196. The third set of recesses 196 are axially spaced from each other by a second set of fingers 200 extending laterally therebetween. The fourth set of recesses 198 are in the third set of recesses 196. The first and second mold halves 182 and 184 are brought together as shown at arrows 202 and 204 such that: the second set of fingers 200 extend laterally into and occupy the first set of recesses 190 and leave a first set of mold cavities 206 in the second set of recesses 192 between the second set of fingers 200 and the first mold half 182, whereby the first set of half-rings 162 are formed in the first set of mold cavities 206; and the first set of fingers 194 extend laterally into and occupy the third set of recesses 196 and leave a second set of mold cavities 208 in the fourth set of recesses 198 between the first set of fingers 194 and the second mold half 184, whereby the second set of half-rings 170 are formed in the second set of mold cavities 208.

In the embodiment of FIG. 12, support tube 150 is a center tube providing an inner liner extending axially in the hollow interior of an annular filter element 154 circumscribing the center tube and supported thereby. In an alternate embodiment, FIG. 7, support tube 150a is an exterior tube providing an outer liner extending axially along and circumscribing the exterior of annular filter element 154 supported thereby. In the embodiments of FIGS. 12 and 7, the arcs of the noted first and second sets of half-rings are semi-circles, and the support tube is a circular cylindrical annulus. In an alternate embodiment, FIG. 8, support tube 150b is a racetrack-shaped annulus. Other annular shapes may be used, such as oval-shaped, and other closed-loop configurations. In each of the embodiments, it is preferred that the axially extending spines such as 156 and 158 are 180° opposite each other, though other spacing may be used. It is further preferred that the arcs of the noted first and second sets of half-rings 162 and 170 define an annulus extending axially between first and second ends 210 and 212, with the annulus having a constant diameter from axial end 210 to axial end 212, i.e. diameter 214 is the same as diameter 216. This constant diameter from end to end is desirable in various applications, and enabled by the present construction and method.

It is recognized that various equivalents, alternatives and modifications are possible within the scope of the appended claims.

What is claimed is:

1. A method for making a filter element support tube having axially extending spines with arcuate rings extending laterally therefrom, said method comprising molding a plastic incinerable member in a two-piece mold without a center core, wherein said two-piece mold is a coreless mold having first and second mold halves, and comprising bringing said first and second mold halves together in mating relation to form mold cavities for said spines and rings without a center core which must be axially withdrawn, and comprising molding said plastic incinerable member to form a pair of axially extending spines diametrically spaced from each other, a first set of half-rings axially spaced from each other by a first set of axial gaps therebetween, each half-ring of said first set extending in an arc between a first end terminating at a first of said spines, and a second end terminating at a second of said spines, the arcs of said half-rings of said first set extending in a first lateral direction from said spines, a second set of half-rings axially spaced from each other by a second set of axial gaps therebetween, each half-ring of said second set extending in an arc between a first end terminating at said first spine, and a second end terminating at said second spine, the arcs of said half-rings of said second set extending in a second lateral direction from said spines opposite to said first lateral direction, said first and second sets of half-rings being axially staggered relative to each other such that the half-rings of said first set are laterally aligned with said second set of axial gaps, and the half-rings of said second set are laterally aligned with said first set of axial gaps, and comprising:

providing said first mold half with first and second sets of recesses and a first set of fingers, said second set of recesses being deeper than and recessed from said first set of recesses, said first set of recesses being axially spaced from each other by said first set of fingers extending laterally therebetween, said second set of recesses being in said first set of recesses;

providing said second mold half with third and fourth sets of recesses and a second set of fingers, said fourth set of recesses being deeper than and recessed from said third set of recesses, said third set of recesses being axially spaced from each by said second set of fingers extending laterally therebetween, said fourth set of recesses being in said third set of recesses;

bringing said first and second mold halves together such that:

said second set of fingers extend laterally into and occupy said first set of recesses and leave a first set of mold cavities in said second set of recesses between said second set of fingers and said first mold half, said first set of half-rings being formed in said first set of mold cavities; and said first set of fingers extend laterally into and occupy said third set of recesses and leave a second set of mold cavities in said fourth set of recesses between said first set of fingers and said second mold half, said second set of half-rings being formed in said second set of mold cavities.

2. The method according to claim 1 comprising bringing said first and second mold halves together to form a continuous flow channel providing said mold cavities in flow communication with each other.

* * * * *